(12) United States Patent
Narayan et al.

(10) Patent No.: US 11,114,688 B2
(45) Date of Patent: Sep. 7, 2021

(54) LITHIUM-ION MIXED CONDUCTOR MEMBRANE IMPROVES THE PERFORMANCE OF LITHIUM-SULFUR BATTERY AND OTHER ENERGY STORAGE DEVICES

(71) Applicant: UNIVERSITY OF SOUTHERN CALIFORNIA, Los Angeles, CA (US)

(72) Inventors: Sri R. Narayan, Arcadia, CA (US); Derek Moy, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 143 days.

(21) Appl. No.: 15/737,494

(22) PCT Filed: Jun. 20, 2016

(86) PCT No.: PCT/US2016/038379
§ 371 (c)(1),
(2) Date: Dec. 18, 2017

(87) PCT Pub. No.: WO2016/205802
PCT Pub. Date: Dec. 22, 2016

(65) Prior Publication Data
US 2018/0159171 A1    Jun. 7, 2018

Related U.S. Application Data

(60) Provisional application No. 62/181,424, filed on Jun. 18, 2015.

(51) Int. Cl.
*H01M 10/056* (2010.01)
*H01M 10/052* (2010.01)
(Continued)

(52) U.S. Cl.
CPC ........ *H01M 10/056* (2013.01); *H01M 4/623* (2013.01); *H01M 10/052* (2013.01); *H01M 10/0565* (2013.01); *H01M 10/0568* (2013.01)

(58) Field of Classification Search
None
See application file for complete search history.

(56) References Cited

U.S. PATENT DOCUMENTS

| 5,314,765 A | 5/1994 | Bates |
| 7,931,989 B2 | 4/2011 | Klaassen |

(Continued)

FOREIGN PATENT DOCUMENTS

| JP | 63-059507 A | 10/1980 |
| JP | 2014523630 A | 9/2014 |

(Continued)

OTHER PUBLICATIONS

Julien. C. et al. "Fabrication of LiCoO2 think-film cathodes for rechargeable lithium microbatteries" Materials Chemistry and Physics 68 (2001) 210-216. (Year: 2000).*

Chen, M. et al, "All-solid-state MoS2/Li6PS5Br/In-Li batteries as a novel type of Li/S battery," J. Mater. Chem. A, 2015, 3, pp. 10698-10702.

(Continued)

*Primary Examiner* — Alix E Eggerding
(74) *Attorney, Agent, or Firm* — Brooks Kushman P.C.

(57) ABSTRACT

A lithium ion mixed conduction membrane includes an optional polymeric binder and a partially lithiated ion conductive material having lithium ion conductivity and electrical conductivity dispersed within the polymeric binder that is capable of improving the performance and cycle life of lithium-sulfur rechargeable batteries and other batteries exhibiting the polysulfide shuttle. One or more lithium ion conduction membranes are placed between the positive and negative electrodes, or adjacent to the negative electrode of a battery and in particular, of a lithium sulfur battery.

21 Claims, 9 Drawing Sheets

(51) Int. Cl.
*H01M 4/62* (2006.01)
*H01M 10/0568* (2010.01)
*H01M 10/0565* (2010.01)

(56) References Cited

U.S. PATENT DOCUMENTS

| | | | |
|---|---|---|---|
| 8,481,195 B1* | 7/2013 | Liu | H01M 10/0562 |
| | | | 429/144 |
| 8,771,879 B2 | 7/2014 | Gordon et al. | |
| 8,778,522 B2 | 7/2014 | Visco et al. | |
| 2005/0175894 A1 | 8/2005 | Visco et al. | |
| 2009/0061288 A1 | 3/2009 | Gordon et al. | |
| 2014/0217992 A1 | 8/2014 | Li et al. | |
| 2014/0234692 A1 | 8/2014 | Wegner et al. | |
| 2017/0309949 A1* | 10/2017 | Jung | H01M 10/05 |

FOREIGN PATENT DOCUMENTS

| | | |
|---|---|---|
| WO | 2013-009750 A2 | 1/2013 |
| WO | 2013-152030 A1 | 10/2013 |
| WO | 2014/176266 A1 | 10/2014 |

OTHER PUBLICATIONS

Extended European Search Report dated May 257, 2019 for EP Appn. No. 16812625.8 filed Dec. 12, 2017, 17 pgs.
Julien, C. et al., "Fabrication of LiCoO2 thin-film cathodes for rechargeable lithium microbatteries," Materials Chemistry and Physics (2001), 68(1), pp. 210-216.
Moy, D. et al., "Direct Measurement of Polysulfide Shuttle Current: A Window into Understanding the Performance of Lithium-Sulfur Cells," J. Electrochem. Soc. (2016) 162, A1-17.
International Search Report dated Sep. 12, 2016 for PCT/US2016/038379, 4 pgs.
European Search Report dated Nov. 29, 2018 for EP Appn. No. 16812625.8 filed Dec. 12, 2017, 15 pgs.
Thomas, M.G.S.R. et al., "Lithium Mobility in the Layered Oxide L1-xCoO2," Solid State Ionics, NL, Elsevier B.V., 1985, v. 17, n. 1, 7 pgs.
Machine Translation of JP Office Action dated Mar. 10, 2020 for Japanese Appn. No. 2017-564908 filed Dec. 14, 2017, 6 pgs.
First Examination Report dated Jun. 26, 2020 for Indian Appn. No. 201817000745, 8 pgs.

* cited by examiner

LITHIUM-ION MIXED CONDUCTOR MEMBRANE IMPROVES THE PERFORMANCE OF LITHIUM-SULFUR BATTERY AND OTHER ENERGY STORAGE DEVICES

CROSS-REFERENCE TO RELATED APPLICATION

This application is the U.S. national phase of PCT Appln. No. PCT/US2016/038379 filed 20 Jun. 2016, which claims the benefit of U.S. Ser. No. 62/181,424 filed 18 Jun. 2015, the disclosures of which are incorporated in its(their) entirety by reference herein.

TECHNICAL FIELD

In at least one embodiment, the present invention is related to lithium-sulfur batteries, and in particular, membranes used in such batteries.

BACKGROUND

The rechargeable lithium-sulfur battery is particularly attractive for energy storage because of its high theoretical energy density of 2600 Wh/kg and the relatively low cost of sulfur. However, the deployment of such batteries has been limited by their low power density and short cycle life. The goal of many researchers is to address these performance issues so that the specific energy of today's lithium sulfur can be exceeded by three to four times.

In a typical lithium-sulfur battery the positive electrode is a sulfur-carbon composite supported on an aluminum foil or grid while the negative electrode is a foil of lithium metal. During discharge, lithium at the negative electrode dissolves into lithium ions and the higher-order polysulfides at the positive electrode are reduced in successive steps to lower-order polysulfides until lithium sulfide is produced. During charging of the cell, lithium ions deposit onto the negative electrode made of lithium metal, and sulfide is re-oxidized to higher-order polysulfides at the positive electrode.

The higher-order polysulfides $S_8^{2-}$, $S_6^{2-}$, and $S_4^{2-}$ generated at the positive electrode are soluble in the electrolyte and can diffuse across the cell to the negative electrode where they are reduced to lower order polysulfides by reaction with metallic lithium. Depending on the state of charge of the cell, the concentration of the different polysulfide species in the cell can vary. The polysulfides are reduced at the lithium electrode then diffuse back to the positive electrode where they are re-oxidized again during charging. This shuttling of the polysulfides between the positive and negative electrode is a parasitic self-discharge process, widely referred to as the "polysulfide shuttle". In addition to self-discharge, the polysulfide shuttle also reduces the cycle life, decreases the charging efficiency, and lowers the power output of the lithium-sulfur cell. When the polysulfide species are reduced to insoluble species at the lithium electrode, the precipitates of sulfides are formed, resulting in irreversible capacity loss of active material as well as passivation of the lithium electrode. Therefore, devising methods to prevent the polysulfide shuttling process has been the focus of most of the recent research efforts in lithium-sulfur batteries.

The most effective method thus far for avoiding the polysulfide shuttle has been the use of lithium nitrate as an additive to the electrolyte. Lithium nitrate reacts with the surface of the lithium metal to form a stable passivation film that prevents soluble polysulfide species from reacting with the lithium metal at the negative electrode and thereby avoiding the self-discharge process. Lithium nitrate, however, is consumed at each cycle for the formation of this beneficial passivating film. Therefore, the effect of lithium nitrate is just temporary. Other attempts to mitigate the polysulfide shuttle include: (1) modification of the structure of the positive electrode to help retain the polysulfides (2) modification of the electrolyte to reduce the solubility of the polysulfides and (3) slowing down the diffusion of the polysulfide through the use of barrier layers. Modifications of the positive electrode typically yield higher utilizations and better rate capabilities but are incapable of sequestering all the soluble polysulfide species that will eventually diffuse out of the structure and contribute to the polysulfide shuttle. Modifications of the electrolyte such as through use of solid electrolytes will effectively inhibit the polysulfide shuttle but generally at the cost of rate capability. Use of barrier layers to slow the diffusion of polysulfides may be effective when the cell is cycling at higher rates but the polysulfide shuttle is still present in these cells and performance will still steadily decrease as a result. Under other operating conditions such as slower cycling or cell idling, the barrier layers will be ineffective at preventing the self-discharge and irreversible capacity losses caused by the polysulfide shuttle.

Accordingly, there is a need for improved membranes for lithium-sulfur batteries that inhibit shuttling of polysulfides.

SUMMARY

The present invention solves one or more problems of the prior art by providing in at least one embodiment, a lithium-ion mixed conduction membrane that is impermeable to these polysulfide ions while capable of conducting lithium ions necessary for charge and discharge processes. The lithium ion mixed conduction membrane includes an optional polymeric binder and a lithium ion conductive material with lithium ion conductivity and electrical conductivity dispersed within the polymeric binder. Characteristically, the lithium ion conductive material is partially lithiated such that the amount of lithium is from 35 mole percent to 90 mole percent of the amount of lithium in the ion conductive material when fully lithiated. The lithium-ion mixed conduction membrane prevents polysulfide species reaching the anode and undergoing irreversible precipitation. A mixed conductor is defined as one in which more than one type of particle carries the charge. In the present case we use this term to describe the ability of the material to transport electrons and lithium ions. Advantageously, the lithium-ion mixed conduction membrane can be used in lithium-sulfur batteries and other batteries exhibiting the polysulfide shuttle (i.e., polysulfide batteries, organic sulfide batteries, and the like).

In another embodiment, a lithium-sulfur battery that incorporates the mixed conduction membrane set forth above is provided. The lithium sulfur battery includes a positive electrode, a negative electrode, and a mixed conduction membrane interposed between the positive electrode and the negative electrode. The mixed conduction membrane includes an optional polymeric binder, and a lithium ion conductive material having lithium ion conductivity and electrical conductivity dispersed within the polymeric binder. Characteristically, the lithium ion conductive material is partially lithiated such that the amount of lithium is from 35 mole percent to 90 mole percent of the amount of lithium in the ion conductive material when fully lithiated.

In another embodiment, a lithium-sulfur battery that incorporates multiple mixed conduction membranes is provided. The lithium sulfur battery includes a positive electrode, a negative electrode, and a first mixed conduction membrane interposed between the positive electrode and the negative electrode. The battery further includes a second mixed conduction membrane interposed between the first mixed conduction membrane and the negative electrode, a first electrolyte layer interposed between the positive electrode and the first mixed conduction membrane, and a second electrolyte layer interposed between the first mixed conduction membrane and the second mixed conduction membrane. The first mixed conduction membrane includes an optional polymeric binder and a lithium ion conductive material having lithium ion conductivity and electrical conductivity dispersed within the polymeric binder. Characteristically, the lithium ion conductive material in the first mixed conduction membrane is partially lithiated such that the amount of lithium is from 35 mole percent to 90 mole percent of the amount of lithium in the ion conductive material when fully lithiated.

Embodiments of the invention demonstrate the advantages of a non-porous lithium ion conduction membrane based on cathode materials such as $Li_zCoO_2$, $Li_zMnO_2$, $Li_zTiS_2$, $Li_zNiO_2$, $Li_{2z}MnO_3$, $Li_zNi_pMn_pCo_{1-2p}O_2$, $Li_zMn_2O_4$, $Li_zCo_2O_4$, $Li_zFePO_4$, $Li_zMnPO_4$, $Li_zCoPO_4$, $Li_zFeSO_4F$, $Li_zVPO_4F$, $Li_zMoS_2$ and combinations thereof, with z being from 0.3 to 0.9 and p being from 0 to 0.3. This membrane relies on mixed ion and electronic conductivity for ion transport. The membrane is sandwiched between two porous separators and surrounded by electrolyte. The non-porous lithium ion exchange membrane allows mobility of lithium ions but prevents soluble polysulfide species from contacting the lithium anode, effectively suppressing the polysulfide shuttle. The non-porous lithium ion exchange membrane is effective in suppressing nearly 85% of the shuttle reaction as indicated by shuttle current measurements, similar to lithium nitrate. Significant cycle life gains over cells with no modification have also been demonstrated in our cycling tests. The lithium ion mixed conduction membrane has both inherent ionic and electronic conductivity. This mechanism of lithium ion transport for this the mixed conduction membrane is different from a membrane that is ionically conducting, but electronically insulating such as LISICON or LIPON. In the latter type of membrane, lithium ions can only be transported through defects, or defect conduction. The advantage of using a mixed conduction membrane is the localization of the applied electric field which allows lithium ions to be electrochemically transported through the membrane by an intercalation reaction, improving the efficiency of lithium ion transport.

DETAILED DESCRIPTION

Figure 1:
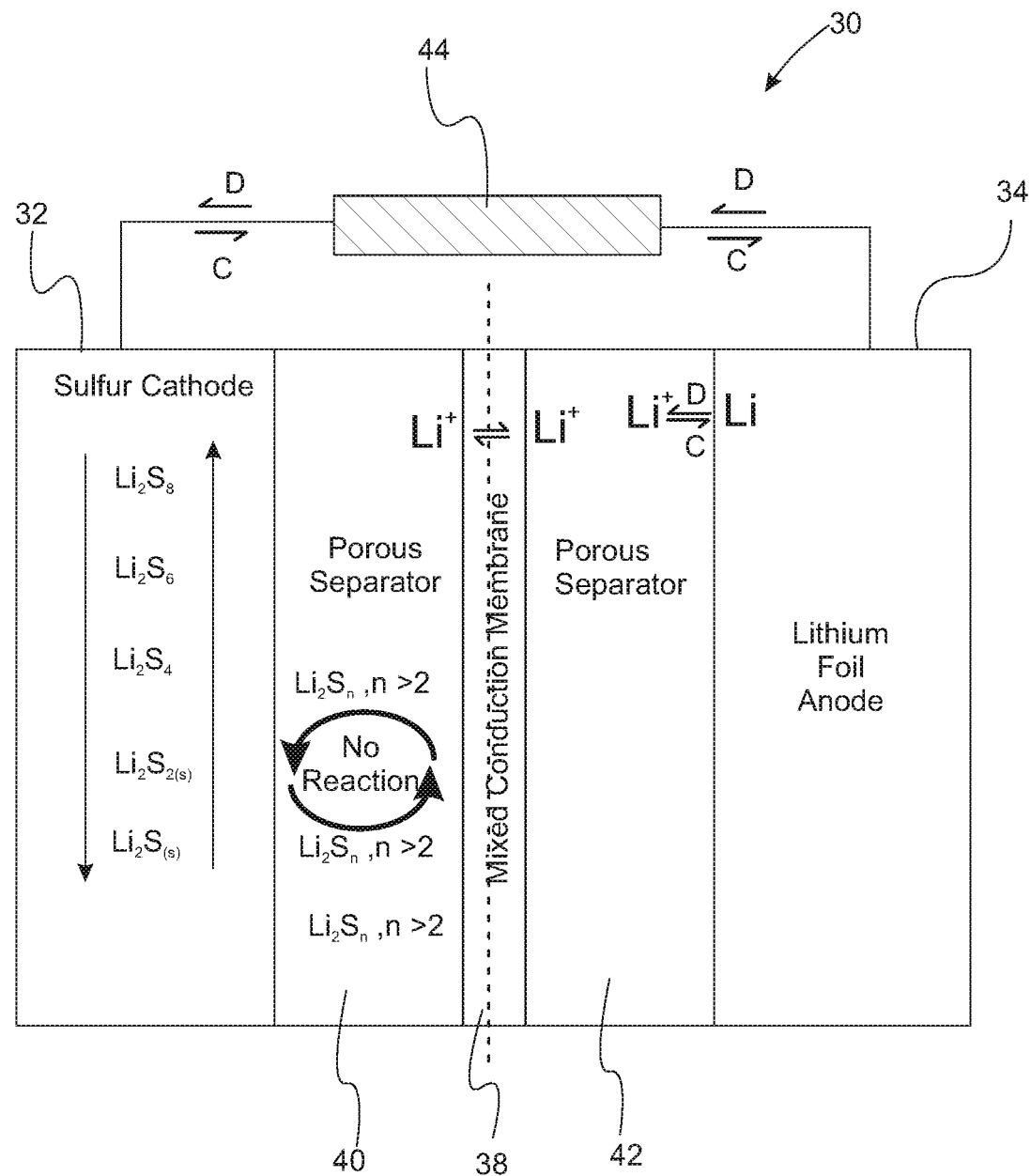
FIG. 1 is a schematic cross section of a lithium-sulfur battery that includes an a mixed conduction membrane having an electronically insulating porous separator and electrolyte layer.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

Abbreviations

"LCO" is lithiated cobalt oxide.

"LiTFSI" is bis(trifluoromethane)sulfonimide lithium.

With reference to FIG. 1, a schematic cross section of a lithium-sulfur battery including an improved membrane that includes an electronically insulating electrolyte layer is provided. Lithium-sulfur battery 30 includes positive electrode 32 and negative electrode 34. Positive electrode 32 is a sulfur-containing cathode while negative electrode 34 is a metal containing anode. Positive electrode 32 can be a sulfur-carbon composite supported on an aluminum foil or grid, while the negative electrode 34 can be a foil of lithium metal. Negative electrode 34 can include lithium metal and/or lithium ions. For example, the negative electrode can have lithium ions intercalated into graphite. In other refinements, the negative electrode can include lithium titanate, or an alloy of lithium and silicon or lithium and aluminum Mixed conduction membrane 38 is placed between positive electrode 32 and negative electrode 34. In this variation, mixed conduction membrane 38 is partially lithiated as set forth below. In a refinement, mixed conduction membrane 38 has a thickness from about 15 to 200 microns. In a further refinement, mixed conduction membrane 38 has a thickness from about 15 to 200 microns. Electrolyte layer 40 is disposed over and contacts the mixed conduction membrane 38. In a refinement, electrolyte layer 40 is interposed between the positive electrode and the membrane 38. Electrolyte layer 42 is positioned between negative electrode 34 and membrane 38. Electrolyte layer 42 can contact negative electrode 34 and/or membrane 38. In a refinement, electrolyte layers 40, 42 are formed from electrically insulating porous polymeric substrates such as polyethylene and polypropylene. Electrolyte layers 40, 42 can be any electrolyte containing layer that prevents the direct electrical contact between membrane 38 and positive electrode 32 and membrane 38 and negative electrode 34. In a refinement, electrolyte layers 40, 42 are each independently a porous separator containing electrolyte. In a refinement, electrolyte layers 40, 42 each independently have a thickness from about 10 to 50 microns. In a further refinement, electrolyte layers 40, 42 each independently have a thickness from about 15 to 30 microns. Examples of such porous separators are polyethylene and polypropylene (e.g., Celgard 2400). In a refinement, electrolyte layers 40, 42 contain an electrolyte and in particular, a lithium ion-containing imbibed into pores. Examples of electrolyte solutions include, but are not limited to, lithium bis(trifluoromethane)sulfonimide and lithium trifluoromethane sulfonate salt dissolved in a solvent (s) such as dioxolane, dimethoxyethane, and tetrahydrofuran or tetraethyleneglycoldimethylether, and mixtures thereof. Advantageously, the design of FIG. 1 avoids the shuttling of polysulfides while reducing lithium dendrite formation.

Figure 2:
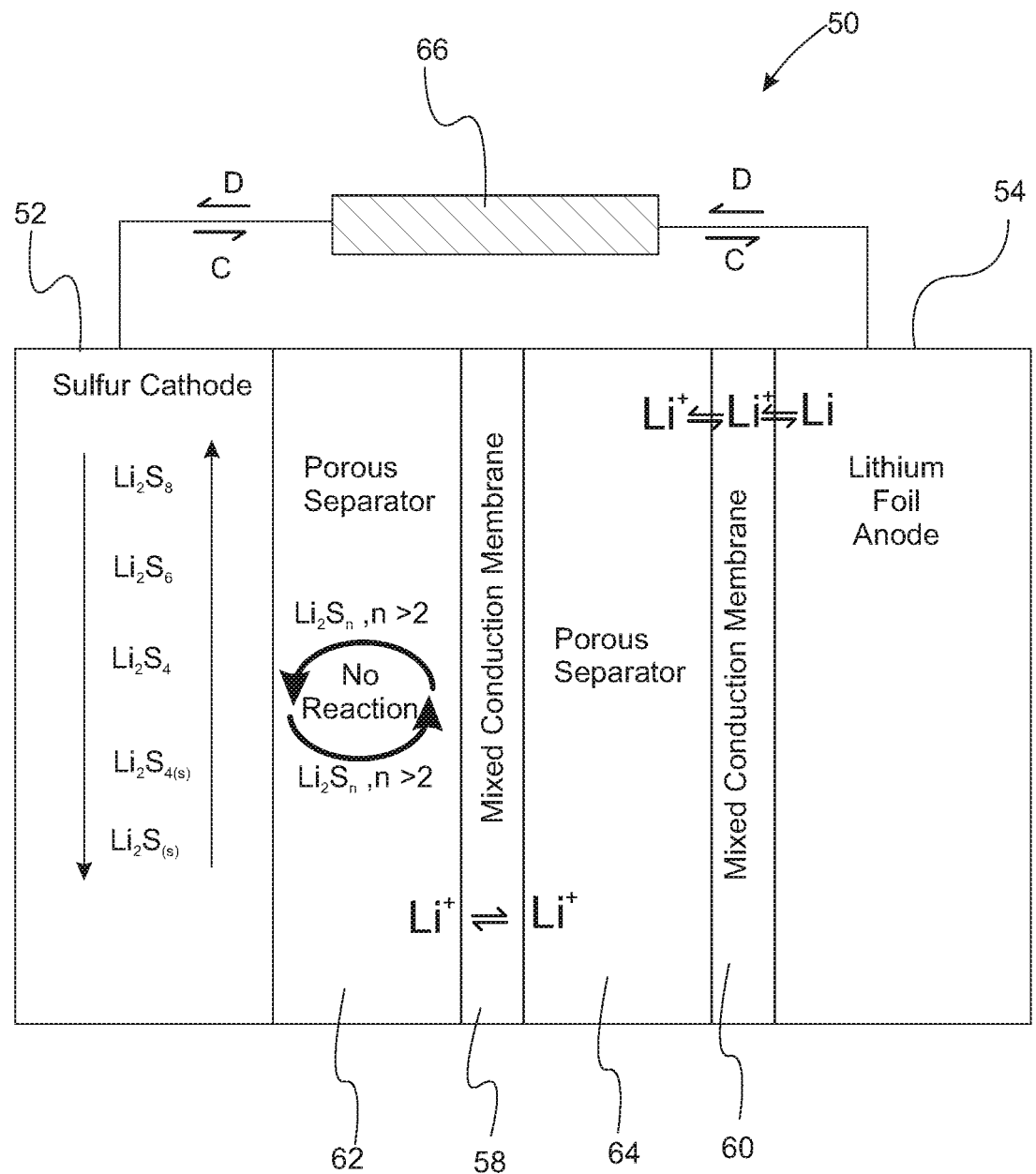
FIG. 2 is a schematic cross section of a lithium-sulfur battery that includes multiple mixed conduction membranes.

FIG. 1 also depicts the movement of species and reactions that occur during charging (c) and discharge (d). During discharge, load 44 is powered by lithium-sulfur battery 30. As depicted in FIG. 2, the liquid or soluble polysulfides (i.e., $Li_2S_n$, n>2) are effectively blocked from passing to porous separator 42 on the negative electrode side by being encapsulated within electronically insulating electrolyte layer 40 by the mixed conduction membrane 38.

With reference to FIG. 2, a schematic cross section of a lithium-sulfur battery including an improved membrane that includes an electronically insulating electrolyte layer is provided. Lithium-sulfur battery 50 includes positive electrode 52 and negative electrode 54. Positive electrode 52 is a sulfur-containing cathode while negative electrode 54 is a metal containing anode. Positive electrode 52 can be a sulfur-carbon composite supported on an aluminum foil or grid, while the negative electrode 54 can be a foil of lithium metal. Negative electrode 54 can include lithium metal and/or lithium ions. For example, the negative electrode can have lithium ions intercalated into graphite. In other refinements, the negative electrode can include lithium titanate, or an alloy of lithium and silicon or lithium and aluminum Mixed conduction membrane 58 and 60 are interposed between positive electrode 52 and negative electrode 54. Mixed conduction membrane 58 is closer to positive electrode 52 than mixed conduction membrane 60. Similarly, mixed conduction membrane 60 is closer to negative electrode 54 than conduction membrane 58. Optionally, mixed conduction membrane 60 can contact negative electrode 54. In this variation, mixed conduction membrane 58 is partially lithiated and referred to as a Type I membrane as set forth below in more detail. In contrast, mixed conduction layer membrane 60 may be fully lithiated or partially lithiated and is referred to as a Type II membrane. In a refinement, mixed conduction membrane 58, 60 each independently have a thickness from about 15 to 200 microns. In a further refinement, mixed conduction membrane 58, 60 each independently have a thickness from about 15 to 200 microns. Electrolyte layer 62 is interposed between and optionally contacts positive electrode 52 and mixed conduction membrane 58 while electrolyte layer 64 is interposed between and optionally contacts mixed conduction membrane 58 and mixed conduction membrane 58. Electrolyte layers 62, 64 are each independently a porous separator as set forth above. In particular, electrolyte layers 62, 64 are each independently a porous separator containing electrolyte. In a refinement, electrolyte layers 62, 64 each independently have a thickness from about 10 to 50 microns. In this variation, mixed conduction membrane 58 is partially lithiated as set forth below. FIG. 2 also depicts the movement of species and reactions that occur during charging (c) and discharge (d). During discharge, load 66 is powered by lithium-sulfur battery 30. Advantageously, this design of the lithium sulfur battery avoids the shuttling of polysulfides and also lithium dendrite formation. In particular, the design of FIG. 2 prevents cell failure by lithium dendrites by nearly completely inhibiting the growth of dendrites.

In one variation, mixed conduction membranes 38, 58 and 60 are a lithium-ion mixed conduction membrane which includes an optional polymeric binder and a lithium ion conductive material having lithium ion conductivity and electrical conductivity dispersed within the polymeric binder. Advantageously, the lithium-ion mixed conduction membrane prevents polysulfide species reaching the anode and undergoing reduction reactions and irreversible precipitation. Moreover, membranes 38, 58 provides a stable mixed conduction that serves to physically exclude soluble polysulfides from diffusing towards the lithium anode while simultaneously allowing transport of lithium ions required for discharge and charge processes. This design effectively avoids the polysulfide shuttle reactions. The materials used for the membrane must be (1) ionically and electronically conducting, (2) non-porous, and (3) positive in equilibrium electrode potential with respect to the fully charged sulfur electrode. The ionic conductivity of the membranes allows the transport of lithium ions necessary for discharge and charge processes. The electronic conductivity of the membranes also allows for rapid lithium ion diffusion through the membrane so that it does not impede cell rate capability. Moreover, the non-porosity of the membrane allows it to physically encapsulate all liquid polysulfides within the positive electrode area, preventing any polysulfides from escaping the positive electrode and contacting the negative electrode. The positive electrode potential of the membrane material prevents polysulfides from reacting with the membrane, preventing self-discharge that would normally occur when polysulfides contact more negative surfaces, such as the lithium electrode.

As set forth above with respect to FIGS. 1 and 2, mixed conduction membranes 38, 58 are Type I membranes that are partially lithiated. In a refinement, the lithium ion conductive material of membranes 38, 58 are each independently lithiated such that the amount of lithium is from 35 mole percent to 90 mole percent of the amount of lithium in the ion conductive material when fully lithiated. In some refinements, the lithium ion conductive material of membranes 38, 58 are each independently partially lithiated such that the amount of lithium is equal to or greater than, in increasing order of preference, 35 mole percent, 40 mole percent, 45 mole percent, or 50 mole percent of the amount of lithium in the ion conductive material when fully lithiated and equal to or less than, in increasing order of preference, 90 mole percent, 85 mole percent, 80 mole percent, or 70 mole percent of the amount of lithium in the ion conductive material when fully lithiated. In a variation, the lithium ion conductive material in the Type I membranes can be partially lithiated nickel cobalt oxide, partially lithiated nickel cobalt aluminum oxide (NCA), partially lithiated nickel manganese oxide, partially lithiated manganese oxides. Specific examples for the partially lithiated ion conductive material include but are not limited to $Li_zCoO_2$, $Li_zMnO_2$, $Li_zTiS_2$, $Li_zNiO_2$, $Li_{2z}MnO_3$, $Li_zNi_pMn_pCo_{1-2p}O_2$, $Li_zMn_2O_4$, $Li_zCo_2O_4$, $Li_zFePO_4$, $Li_zMnPO_4$, $Li_zCoPO_4$, $Li_zFeSO_4F$, $Li_zVPO_4F$, and combinations thereof in the case of Type I membranes, and combinations thereof, with z being from 0.3 to 0.9 and p being from 0 to 0.3. Type II membranes can be these materials as well as $Li_zMoS_2$ and $Li_zFePO_4$. In a refinement, n is greater than or equal to, in increasing order of preference, 0.3, 0.35, 0.5, 0.45, or 0.5 and less than or equal to, in increasing order of preference, 0.9, 0.8, 0.75, 0.7 or 0.6 In this regard, partially lithiated $Li_zCoO_2$ is found to be particularly useful. It should be appreciated that fully lithiated material (i.e., z=1) is undesirable particular for membranes 38 and 58 because of the low lithium ion conductivity and low lithium diffusion coefficient at high lithiation values. (see, Julien, C., Camacho-Lopez, M. A., Escobar-Alarcon, L., & Haro-Poniatowski, E. (2001). *Fabrication of LiCoO₂ thin-film cathodes for rechargeable lithium microbatteries.* Materials chemistry and physics, 68(1), 210-216; the entire disclosure of which is hereby incorporated by reference). Moreover, low lithiation is also undesirable for membranes 38 and 58 because the crystal structure can change (e.g., collapse) at low levels (e.g., z>0.3). An example of a useful binder is polyvinylidene fluoride (PVDF). Membranes constructed from these materials are flexible and can be cut into various shapes and sizes. Moreover, these membranes are impervious to polysulfides due to its dense morphology and low porosity as demonstrated by the scanning electron micrographs of FIG. 3.

Figure 4:
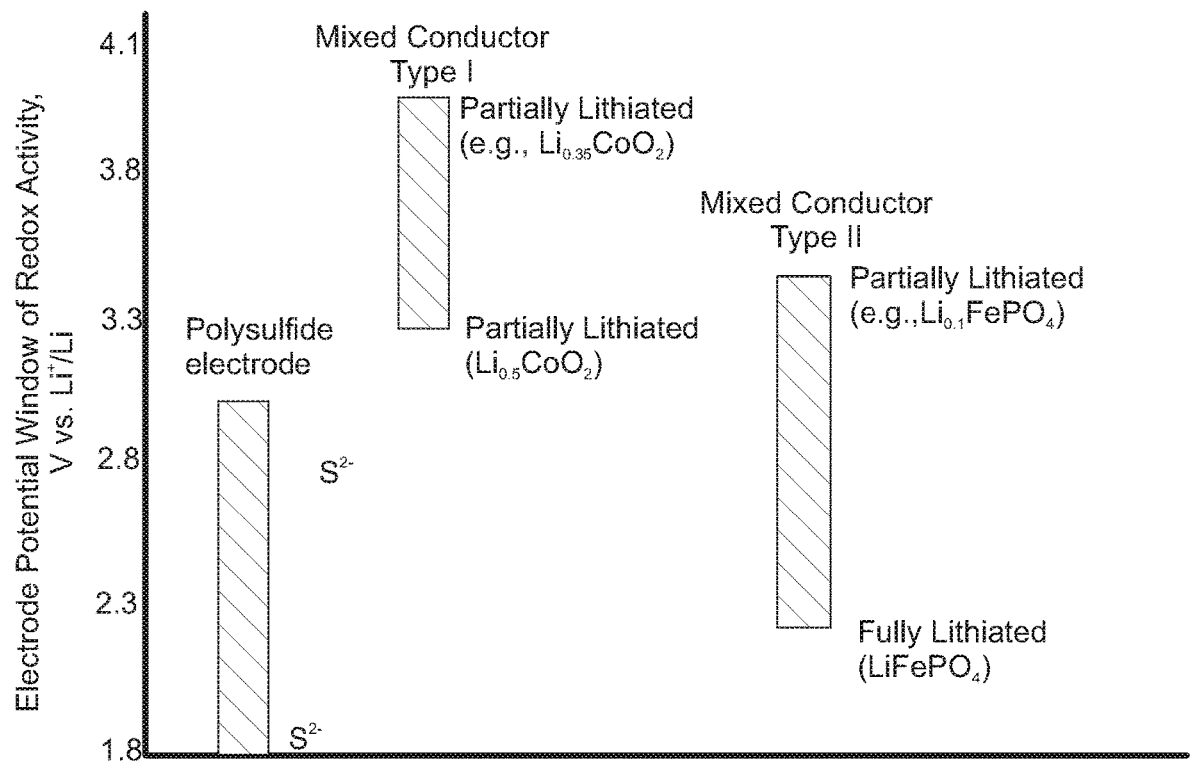
FIG. 4 provides a bar chart comparing the electrode potential of a sulfide cathode and mixed conduction membranes Type I and II versus the electrode potential of a $Li^+/Li$ electrode.

In contrast, membrane 60 which is a Type II membrane can be formed from lithium ion conductive material that is fully or partially lithiated. Type II membranes are distinguished from Type I by the range of electrode potentials in which they operate. For example Type I membrane is significantly more positive in electrode potential without overlapping with the electrode potential range of the sulfur electrode (FIG. 4). With Type II membranes the electrode potential range of operation can overlap with that of the sulfur electrode. In this context, "fully lithiated means that the lithium ion conductive material has a lithium concentration at the maximum amount that the material can accept. Therefore, the lithium ion conductive material of membrane 60 can be lithiated such that the amount of lithium is from 35 mole percent to 100 mole percent of the amount of lithium in the ion conductive material when fully lithiated. In some refinements, the lithium ion conductive material of membrane 60 is lithiated such that the amount of lithium is equal to or greater than, in increasing order of preference, 35 mole percent, 40 mole percent, 45 mole percent, or 50 mole percent of the amount of lithium in the ion conductive material when fully lithiated and equal to or less than, in increasing order of preference, 100 mole percent, 90 mole percent, 80 mole percent, or 70 mole percent of the amount of lithium in the ion conductive material when fully lithiated.

Within membranes 38, 58, and 60 lithium ion conduction occurs by the intercalation/de-intercalation mechanism that is the basis of the use of such materials as cathodes in lithium ion batteries.

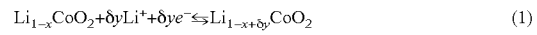

$$Li_{1-x}CoO_2 + \delta y Li^+ + \delta y e^- \leftrightarrows Li_{1-x+\delta y}CoO_2 \qquad (1)$$

where x is typically from 0.001 to 0.5 and δy is typically from 0.001 to 0.5. As indicated in equation 1, the localized intercalation reaction requires participation of the electron and lithium ion. Good electronic conductivity annuls the build-up of electric potential gradients arising from variations in lithium ion concentration in the bulk of the membrane and assists with the rapid lithium ion diffusion through the intercalation reaction pathway.

A simplified view of these processes may be achieved by drawing an imaginary plane through the membrane layer, as indicated by the dashed line in FIG. 2, and consider the left hand side and right hand side as two separate cells that are connected back to back electrically. This allows us to understand the role of mixed ionic and electronic conduction in such a lithium ion conducting film.

Although operation of the membrane is not limited to any particular mechanism, it is believed that the electronic conductivity arises from the conduction band formed by Co(III) and Co(IV). Removal of a lithium ion from the oxide lattice and causes an increase in the oxidation state of a cobalt ion in the lithiated cobalt oxide lattice. A neighboring cobalt ion will provide an electron to the oxidized cobalt via the partially-filled conduction band and provide a new site for lithium ion removal. Thus, electron conduction and ion conduction will have to occur concomitantly for such intercalation materials to conduct lithium ions effectively without change of composition. It should also be appreciated that during lithium ion conduction in such a structure, there is no net change in the composition of lithium in the cobalt oxide matrix, although small changes could occur locally that would be rapidly equalized by electronic conduction and ion movement. Partially lithiated cobalt oxide is even better suited for this function, as it has higher lithium ion diffusivity compared to fully lithiated cobalt oxide. Also, the partially lithiated structure and does not present high barriers to lithium ion injection as may be encountered in a fully lithiated cobalt oxide structure. The potential of the membrane remains unchanged, 4 V vs Li+/Li, since there is no net change in the lithiated cobalt oxide composition. FIG. 4 provides a bar chart comparing the electrode potential of a sulfide cathode and mixed conduction membranes Type I and II versus the electrode potential of a $Li^+/Li$ electrode in which a lithium metal electrode is immersed in a solution of 1 M lithium bis(trifluoromethane) sulfonimide dissolved in 1:1 mixture of dioxolane and dimethoxyethane at 25° C. The potential of the lithiated cobalt oxide is greater than the potential of the sulfur-carbon composite electrode. This difference in potential prevents the self-discharge of polysulfides that diffused from the soluble sulfur electrode. Essentially, polysulfides that are normally reduced on the more negative lithium surface are now physically excluded from the lithium in addition to being electrochemically prevented from reducing on the lithiated cobalt oxide surface. In a first electrode potential variation, the electrode potential of mixed conduction membranes 38, 58 is at least 3.3 volts greater than the electrode potential of a $Li^+/Li$ electrode in which a lithium metal electrode is immersed in a solution of 1 M lithium bis(trifluoromethane) sulfonimide dissolved in 1:1 mixture of dioxolane and dimethoxyethane at 25° C. In a second electrode potential variation, the electrode potential of mixed conduction membranes 38, 58 is at least 3.3 volts greater than the electrode potential of the negative lithium electrode (e.g., negative electrode 34 of FIG. 1 or negative electrode 54 of FIG. 2) in an operating battery (e.g., during battery discharge). In some refinements, the electrode potential of mixed conduction membranes 38, 58 is greater than or equal to, in increasing order of preference, 3.3, 3.4, 3.5, 3.7, 3.8 or 3.9 volts and less than or equal to, in increasing order of preference, 5.0, 4.5, 4.2, 4.1, or 4.0 the electrode potential of a $Li^+/Li$ electrode in which a lithium metal electrode is immersed in a solution of 1 M lithium bis(trifluoromethane) sulfonimide dissolved in 1:1 mixture of dioxolane and dimethoxyethane at 25° C. In other refinements, the electrode potential of mixed conduction membranes 38, 58 is greater than or equal to, in increasing order of preference, 3.3, 3.4, 3.5, 3.7, 3.8 or 3.9 volts and less than or equal to, in increasing order of preference, 5.0, 4.5, 4.2, 4.1, or 4.0 the electrode potential of the negative lithium electrode (e.g., negative electrode 34 of FIG. 1 or negative electrode 54 of FIG. 2) in an operating battery (e.g., during battery discharge).

Figure 3B:
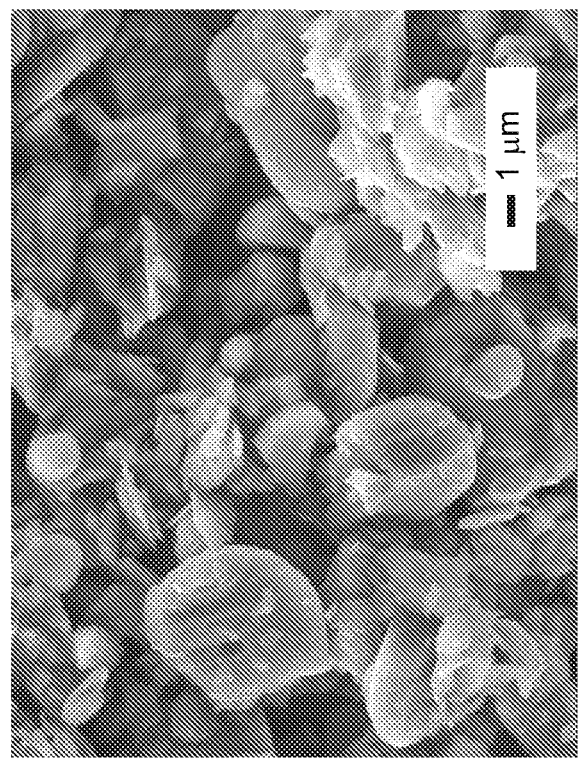
FIG. 3 provides scanning electron microscopy images of a lithiated cobalt oxide membrane.
Figure 3A:
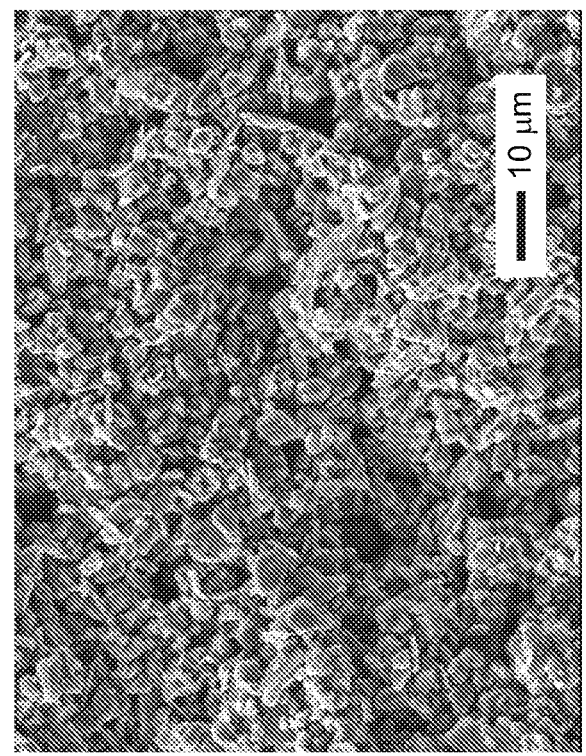

Other intercalation cathode materials such as the lithiated nickel cobalt oxide, NCA, lithiated nickel manganese oxide, lithium iron phosphate, lithiated manganese oxides, can also be used for the membrane. Such a membrane is flexible, can be cut into various shapes and sizes and is impervious to polysulfides due to its a highly dense morphology and low porosity (FIG. 3).

The following examples illustrate the various embodiments of the present invention. Those skilled in the art will recognize many variations that are within the spirit of the present invention and scope of the claims.

I. Experimental Results for the Lithium-Sulfur Battery of FIG. 1

Fabrication:

The lithium ion mixed conduction membrane used for this study is prepared from lithiated cobalt oxide of the formula, $LiCoO_2$. A mixture of lithiated cobalt oxide (LCO) and polyvinylidene fluoride (PVDF) binder is mixed in a ratio ranging from 1:10 to 1:20 for LCO:PVDF. N-methyl-2-pyrrolidone is added as a solvent to the mixture to create a slurry. The slurry is ball-milled for 30 minutes and coated onto an aluminum foil substrate. The thickness of the coating is typically in the range of 100-200 microns. The coated membrane is dried for 4-8 hours at 80-100° C. The membrane coated onto the aluminum foil is cut into a size appropriate for the intended cell after it has been thoroughly dried. The aluminum foil is peeled off of, leaving behind a free-standing membrane. The membrane is compressed to a final thickness of 50 microns.

Testing:

The properties of the lithium-sulfur cell with the new lithium ion mixed conduction membrane was tested in a 2032 coin cell configuration. A sulfur-carbon composite electrode prepared from a mixture of 60:30:10 sulfur (Sigma Aldrich), acetylene black (Alfa Aesar), and PVDF (MTI) binder was used as the positive electrode and a lithium metal foil (MTI) was used as the negative electrode. The two separators used were polypropylene separators (Celgard 2400). The electrolyte used was 1M LiTFSI in a 1:1 mixture of dimethoxyethane and dioxolane solvent. A similar cell without the membrane was fabricated for comparison. The cell designs are illustrated in FIG. 1. These cells were subject to galvanostatic cycling at C/20 rates for 200 cycles for determining the charge to discharge coulombic efficiency, and at C/2 to determine the effectiveness of the membrane for preventing the shuttling of the soluble polysulfide redox couples in addition to shuttle current measurements. By restricting the cycling to the region of the discharge curve where only soluble polysulfides are present, we could study the effectiveness of the membrane in preventing the shuttling of the polysulfides. Thus, the benefit of suppressing the polysulfide shuttle on the cycle life could be studied independently of other degradation mechanisms.

Figure 5:
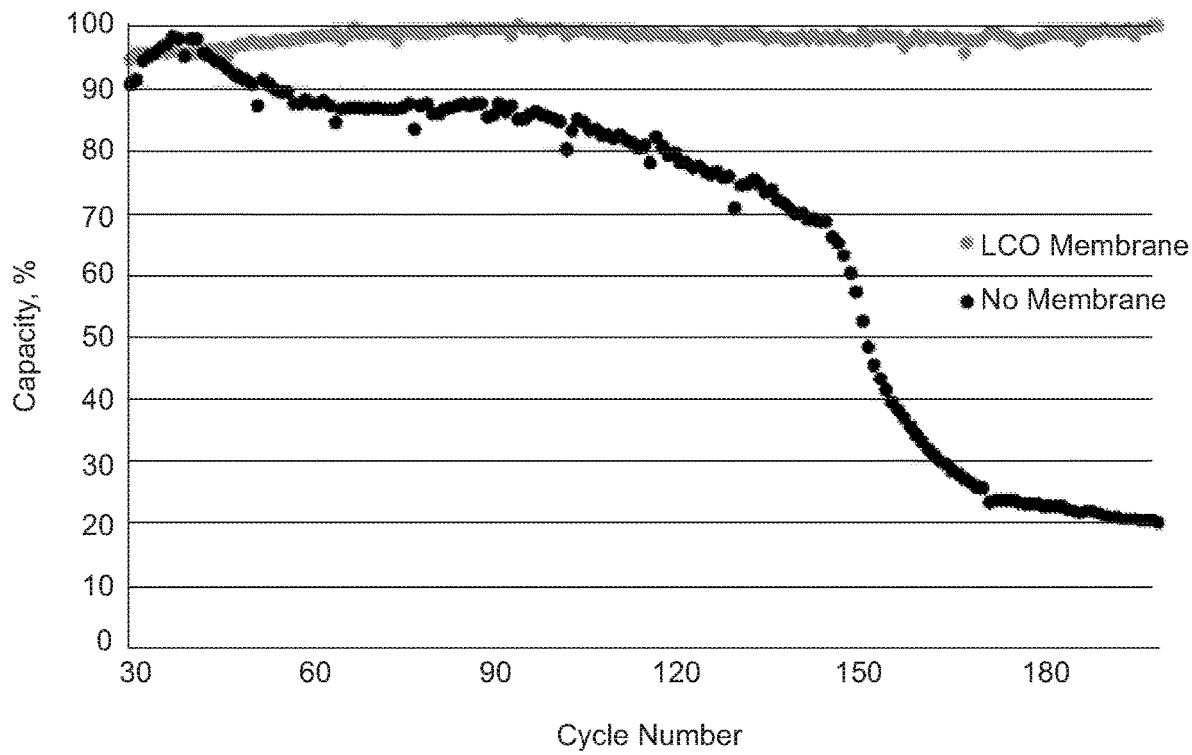
FIG. 5 provides plots showing the cycle life of a lithium-sulfur cell with and without the lithiated cobalt oxide mixed conduction membrane at C/2 rate.
Figure 6:
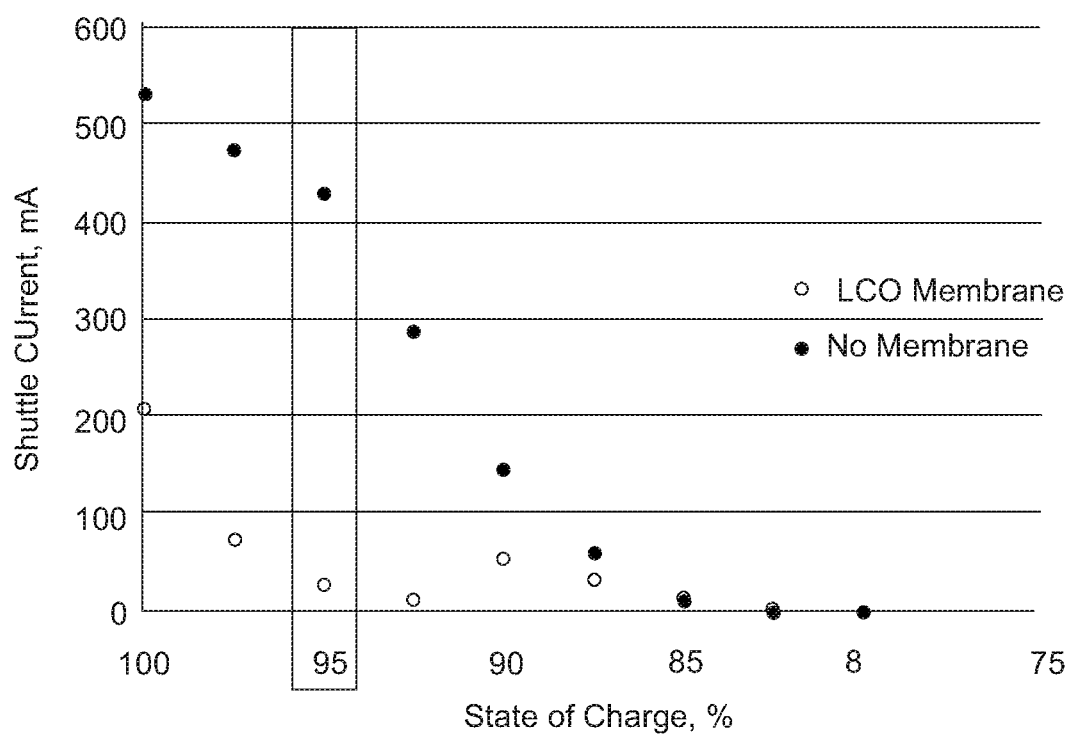
FIG. 6 provides shuttle current measurements of a lithium-sulfur cell with and without the LCO mixed conduction membrane normalized to the capacity of the cell.

Cycle Life:

The lithium-sulfur cell with the LCO membrane retained 83% of its initial capacity after 200 cycles while the lithium-sulfur cell with no membrane retained only 18% of its initial capacity after 200 cycles as shown in FIG. 5. After the electrode formation within the first 25 cycles, the lithium-sulfur cell with the LCO membrane did not exhibit any further capacity loss while the lithium-sulfur cell with no membrane continued to decrease in capacity. The stability in capacity is due to the suppression of the polysulfide shuttle using the mixed conduction membrane.

Shuttle Current:

Shuttle current measurements were carried out to quantify the activity of the polysulfide shuttle. Shuttle current measurements are steady-state current measurements taken at various states of charge at constant voltage (D. Moy, A. Manivannan, and S. R. Narayanan, "Direct Measurement of Polysulfide Shuttle Current: A Window into Understanding the Performance of Lithium-Sulfur Cells." *J. Electrochem. Soc.* 162 (2015) A1-A7; the entire disclosure of which is hereby incorporated by reference). Steady-state currents measured at states of charge greater than 75%, where the sulfur species are present as soluble polysulfides, are attributable to shuttle currents. The shuttle currents of the lithium-sulfur cell with the LCO membrane were significantly lower than those of the lithium-sulfur cell with no membrane. At 95% state of charge, the lithium-sulfur cell with the LCO membrane was capable of suppressing 87.5% of the shuttle reaction compared to the lithium-sulfur cell with no membrane. Thus, the mixed conduction membrane is capable of significantly increasing the cycle life of lithium-sulfur cells by suppressing the polysulfide shuttle reaction.

II. Experimental Results for the Lithium-Sulfur Battery of FIG. 2

In the present study we constructed and cycled lithium-sulfur coin cells with in-house fabricated compact mixed conduction membranes using an additional porous separator containing electrolyte for the electronically insulating electrolyte layer. We show that the polysulfide species are not transported while lithium ions can move across the membrane just as in the liquid electrolyte. We demonstrate the operation and benefits of this type of membrane by (1) direct measurement of the polysulfide shuttle current, a measure of the rate of shuttling, (2) the substantially improved charge/discharge efficiency indicating that the self-discharge process is suppressed, and (3) avoidance of capacity fade comparable to the effect of lithium nitrate additive.

EXPERIMENTAL

Sulfur Cathode Fabrication. Sulfur (Aldrich, 99.5% purity), acetylene black (Alfa Aesar), and polyvinylidene fluoride (PVDF) binder (MTI) were mixed in 60%, 30%, and 10% by weight quantities with N-methyl-2-pyrrolidone (NMP) solvent (Aldrich) to form a slurry. The slurry was coated onto an aluminum foil substrate using a doctor blade to a thickness of approximately 150 micrometers. The resulting electrode was dried under vacuum at 70° C. for 8 hours and punched into disks of 14 mm in diameter. The total sulfur loading in the cathode was approximately 2.7 mg/cm$^2$.

LCO Membrane Fabrication.

Lithiated cobalt oxide (MTI) and PVDF were mixed in 95% and 5% by weight quantities with NMP to form a slurry. The slurry was coated onto an aluminum foil substrate using a doctor blade to a thickness of approximately 100 micrometers. The coated aluminum foil was hot pressed to 140° C. with 0.5 kg/cm$^2$ and dried in a vacuum oven at 70° C. for 8 hours. The coated aluminum foil was punched into disks that were 16 mm in diameter and the aluminum foil substrate was peeled off to yield a free-standing lithiated cobalt oxide membrane.

Cell Construction.

Coin cells of the 2032-type (MTI) were assembled using lithium foil (MTI) as the anode, two polypropylene separators (Celgard 2400), and electrolyte composed of 1M lithium bis(trifluoromethane) sulfonimide (LiTFSI, Aldrich) in a 1:1 by volume mixture of dioxolane and dimethoxyethane (Aldrich). The LCO membrane was inserted in between the two polypropylene separators for cells. Cells with 0.25M lithium nitrate (Aldrich) additive in the electrolyte were also assembled with no membrane and tested for comparison.

Galvanostatic Cycling.

Coin cells were subject to cycling under galvanostatic conditions using a MTI battery analyzer (BST8-MA). Cells were cycled at C/20, C/15, C/10, C/5, C/2, and C rates. The charging was cut off at 2.7 V while the discharging was terminated when the cell voltage reached 1.7 V.

Shuttle Current Measurements.

Shuttle currents of coin cells were measured using a PAR VMC-4 potentiostat. Coin cells were cycled at C/20 rate for 5 cycles to ensure complete "formation" of the cathode as well as attainment of stable initial capacity. The cells were then discharged to 2.30 V at the C/20 rate and held at that voltage until steady state currents were observed (up to 10 hours). This steady state current was recorded as the shuttle current. This process was repeated at 2.25, 2.20, 2.15, and 2.10 V with each cell type to measure the shuttle currents present during the soluble discharge region of the sulfur cells.

Electrochemical Impedance Spectroscopy.

Impedance of coin cells were measured using a PAR VMC-4 potentiostat using an applied potential amplitude of 2 mV in the frequency range of 0.01 to 10,000 Hz.

Results and Discussion

Discharge/Charge Efficiency.

Figure 7:
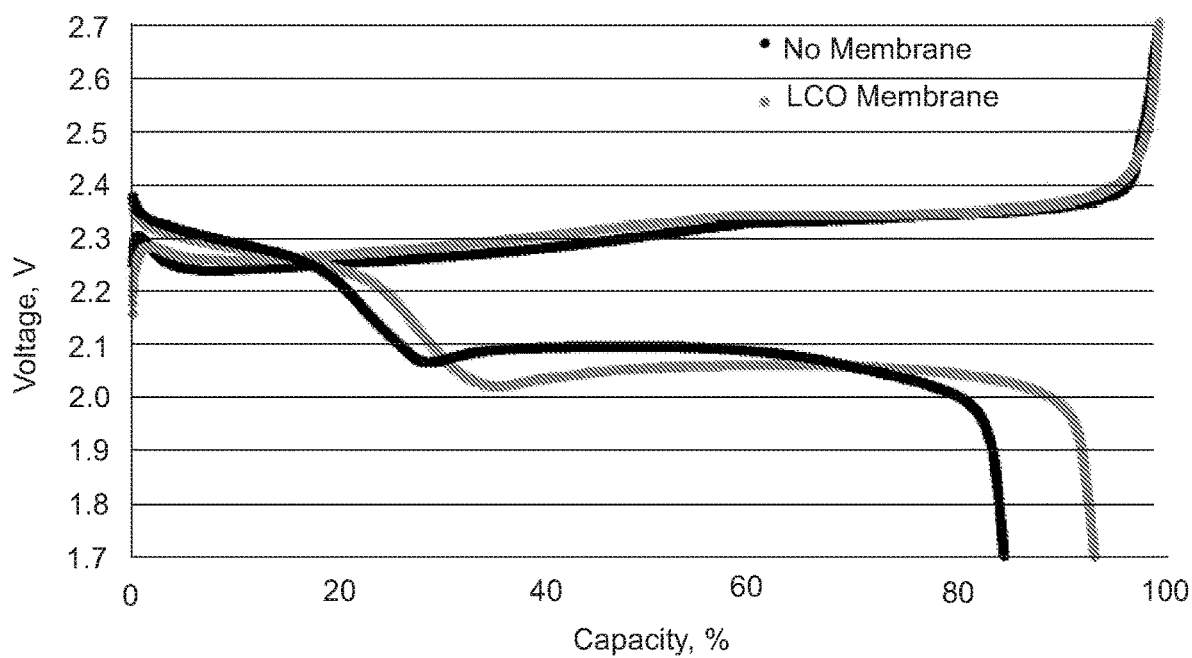
FIG. 7 provides discharge and charge profiles at the fifth cycle of lithium-sulfur cells at C/20 with a lithiated cobalt oxide (LCO) membrane and without a membrane.

The discharge-to-charge efficiencies (FIG. 7) for the cell with a LCO membrane was at least 13% higher than for a cell without the membrane suggesting a 66% reduction in the polysulfide shuttle current. The discharge to charge ratio was 94% for the cell with a LCO membrane and 81% for the cell without a membrane. It was clear that the LCO membrane excluded the polysulfide species substantially. The LCO membrane being non-porous and only supporting the transporting of lithium ions, the soluble polysulfides cannot diffuse through the membrane towards the lithium anode. In the case of the cell without a membrane, the polysulfide shuttle can freely move between the electrodes. Therefore soluble polysulfides diffuse to the lithium anode where they are reduced. These reduced polysulfides will shuttle back to the sulfur cathode were they are reoxidized, resulting in the lower discharge-to-charge efficiencies.

Shuttle Currents.

Figure 8:
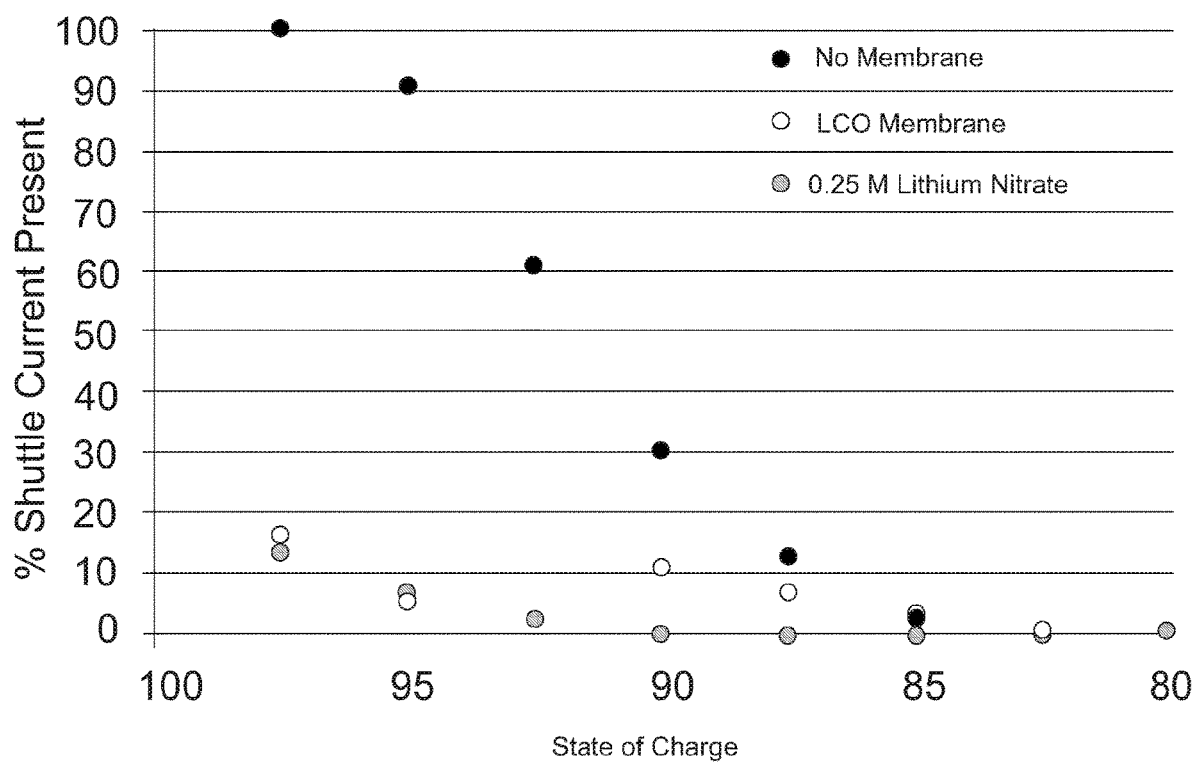
FIG. 8 provides shuttle current measurements for lithium-sulfur cells with no membrane, no membrane with 0.25M lithium nitrate additive, and with LCO membrane.

The shuttle current is a measure of the rate of transport of the polysulfide shuttle between the two electrodes. As mentioned earlier, we have developed a method to measure this type of current accurately. This shuttle current measurement can be used to determine the direct impact of the membrane in blocking the polysulfide shuttle. We have compared the shuttle current in three types of cells: (1) cell with no membrane, (2) cell with the LCO membrane, and (3) cell containing 0.25 M lithium nitrate additive (FIG. 8). In a cell with no membrane, the polysulfide shuttle is operative at the maximum rate, especially near 100% state-of-charge where most of the polysulfides are present at the sulfur electrode in a soluble form. At lower states-of-charge, less soluble polysulfides appear and the shuttle current begins to decrease For the cells with 0.25 M lithium nitrate additive and for the cells with LCO membrane, the initial shuttle current was already ten times lower than that of cell without the membrane, and the current dropped to almost zero by 92% state-of-charge. Thus, the shuttle current measurement indicated that both lithium nitrate and the LCO membrane are capable of largely suppressing the polysulfide shuttle transport. Also, the shuttle current measurement has served its intended purpose of directly probing the polysulfide transport between the electrodes of the lithium-sulfur cell.

Though both the lithium nitrate additive and LCO membrane inhibit the polysulfide shuttle effectively, they do so by different means. Lithium nitrate is consumed during each cycle to form a protective solid electrolyte interphase (SEI) on the lithium anode to prevent electrochemical reaction of the polysulfide at the lithium electrode. The LCO membrane is a robust membrane that physically excludes polysulfides from contacting the lithium anode altogether. While lithium nitrate is consumed during cycling, the LCO membrane remains intact and continues to perform its function cycle after cycle.

Electrochemical Impedance Spectroscopy.

Figure 9:
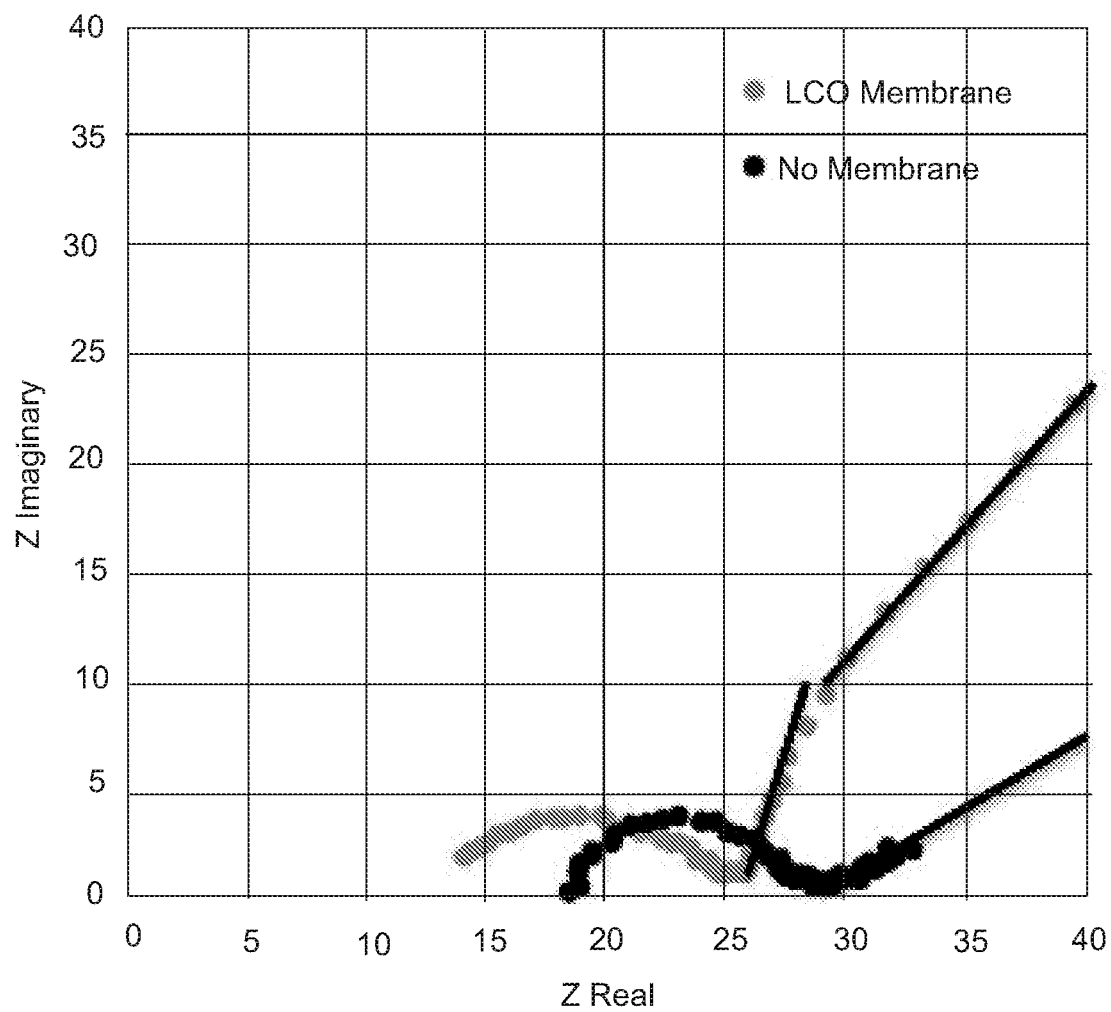
FIG. 9 provides electrochemical impedance spectra of a lithium-sulfur cell with a LCO membrane and without a membrane.

Impedance measurements indicate that the high frequency resistance of the cell with the LCO membrane is similar or even slightly lower than that for the cell without the membrane (FIG. 9). Therefore the ionic transport and electron transport through the LCO membrane are not hindered. At lower frequencies, the impedance is governed by the various interfacial electrochemical processes. The faradaic resistance elements appeared to be similar for the cells with and without the LCO membrane. The presence of the LCO membrane that adds two extra interfaces of the membrane with the electrolyte at which electrochemical reactions occur for lithium ion to be transported. However, these additional interfaces do not increase the observed impedance values, suggesting that the lithium ion transport process is quite facile through the LCO membrane. The two different modes of diffusion are observed for the cell with the membrane. Initially, the diffusion line for the cell with the LCO membrane has a 60° angle but eventually turns into a 45° angle. The cell without the membrane only shows a 45° angle diffusion line. These two different diffusion lines suggest the mechanism of lithium-ion transport is different for the cell with and without the LCO membrane.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lithium ion mixed conduction membrane comprising:
a polymeric binder; and
a lithium ion conductive material having lithium ion conductivity and electrical conductivity dispersed within the polymeric binder, the lithium ion conductive material being partially lithiated in an amount from 35 mole percent to 90 mole percent per mole of lithium in the lithium ion conductive material when the lithium ion conductive material is fully lithiated wherein the lithium ion conductive material is selected from the group consisting of wherein the lithium ion conductive material is selected from the group consisting of $Li_zMnO_2$, $Li_{2z}MnO_3$, $Li_zCo_2O_4$, $Li_zFeSO_4F$, $Li_zVPO_4F$, $Li_zMoS_2$ and combinations thereof, with z being from 0.3 to 0.9 and wherein the lithium ion conductive is partially lithiated such that the electrode potential of the lithium ion mixed conduction membrane does overlap with the electrode potential range of a sulfur-containing cathode when the lithium ion mixed conduction membrane is positioned in a battery including the sulfur-containing cathode.

2. The lithium ion mixed conduction membrane of claim 1 having an electrode potential at least 3.3 volts higher than the electrode potential of a $Li^+/Li$ electrode.

3. The lithium ion mixed conduction membrane of claim 1 wherein z is from 0.4 to 0.8.

4. The lithium ion mixed conduction membrane of claim 1 wherein the polymeric binder is an electrically insulating polymer.

5. The lithium ion mixed conduction membrane of claim 1 wherein the polymeric binder is polyvinylidene fluoride.

6. A battery comprising:
a sulfur-containing positive electrode including a sulfur-carbon composite supported on an aluminum foil or grid;
a negative electrode; and
a mixed conduction membrane interposed between the sulfur-containing positive electrode and the negative electrode, the mixed conduction membrane including a polymeric binder; and
a lithium ion conductive material having lithium ion conductivity and electrical conductivity dispersed within the polymeric binder, the lithium ion conductive material being partially lithiated in an amount from 35 mole percent to 90 mole percent per mole of lithium in the lithium ion conductive material when the lithium ion conductive material is fully lithiated and wherein the lithium ion conductive is partially lithiated such that the electrode potential of the mixed conduction membrane does overlap with the electrode potential range of the sulfur-containing positive electrode when the battery is operated, wherein the lithium ion conductive material is selected from the group consisting of $Li_zMnO_2$, $Li_{2z}MnO_3$, $Li_zCo_2O_4$, $Li_zFeSO_4F$, $Li_zVPO_4F$, $Li_zMoS_2$ and combinations thereof, with z being from 0.3 to 0.9.

7. The battery of claim 6 wherein the negative electrode includes lithium metal or lithium ions.

8. The battery of claim 6 wherein the mixed conduction membrane has and electrode potential at least 3.3 volts higher than the electrode potential of the negative electrode.

9. The battery of claim 6 wherein the polymeric binder is an electrically insulating polymer.

10. The battery of claim 6 further comprising a first electrolyte layer interposed between the sulfur-containing positive electrode and the mixed conduction membrane.

11. The battery of claim 10 further comprising a second electrolyte layer interposed between the negative electrode and the mixed conduction membrane.

12. The battery of claim 11 wherein the first electrolyte layer and the second electrolyte layer each independently include a polymeric substrate with an electrolyte solution imbibed therein.

13. The battery of claim 10 wherein the first electrolyte layer is a lithium ion-containing solution.

14. A battery comprising:
a positive electrode;
a negative electrode; and
a first mixed conduction membrane interposed between the positive electrode and the negative electrode;
a second mixed conduction membrane interposed between the first mixed conduction membrane and the negative electrode, the second mixed conduction membrane including a partially or fully lithiated ion conductive material;
a first electrolyte layer interposed between the positive electrode and the first mixed conduction membrane;

a second electrolyte layer interposed between the first mixed conduction membrane and the first mixed conduction membrane, wherein the first mixed conduction membrane includes:

an polymeric binder; and a lithium ion conductive material having lithium ion conductivity and electrical conductivity dispersed within the polymeric binder, the lithium ion conductive material being partially lithiated in an amount from 35 mole percent to 90 mole percent per mole of lithium in the lithium ion conductive material when the lithium ion conductive material is fully lithiated, wherein the lithium ion conductive is partially lithiated such that the electrode potential of the first mixed conduction membrane does overlap with the electrode potential range of a sulfur-containing cathode when the battery is operated, wherein the lithium ion conductive material is selected from the group consisting of $Li_zMnO_2$, $Li_{2z}MnO_3$, $Li_zCo_2O_4$, $Li_zFeSO_4F$, $Li_zVPO_4F$, $Li_zMoS_2$ and combinations thereof, with z being from 0.3 to 0.9.

15. The battery of claim 14 wherein the negative electrode includes lithium metal or lithium ions.

16. The battery of claim 15 wherein the first mixed conduction membrane has and electrode potential at least 3.3 volts higher than the electrode potential of the negative electrode.

17. The battery of claim 14 wherein the polymeric binder is an electrically insulating polymer.

18. The battery of claim 14 wherein the first electrolyte layer and the second electrolyte layer are each independently a porous separator with electrolyte imbibed therein or an electronically insulating electrolyte layer.

19. The battery of claim 18 wherein the electrolyte is a lithium ion-containing solution.

20. The battery of claim 18 wherein the second mixed conduction membrane includes a partially lithiated ion conductive material.

21. The battery of claim 18 wherein the second mixed conduction membrane includes a fully lithiated ion conductive material.

* * * * *